US009651250B2

(12) United States Patent
Thom

(10) Patent No.: US 9,651,250 B2
(45) Date of Patent: *May 16, 2017

(54) SYSTEMS AND METHODS FOR TRANSPORTING AND COLLECTING BIO-WASTE

(71) Applicant: Jerry D. Thom, Sandy, UT (US)

(72) Inventor: Jerry D. Thom, Sandy, UT (US)

(73) Assignee: Jerry Thom, Sandy, UT (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/707,527

(22) Filed: May 8, 2015

(65) Prior Publication Data

US 2016/0122994 A1 May 5, 2016

Related U.S. Application Data

(63) Continuation-in-part of application No. 14/531,297, filed on Nov. 3, 2014, now Pat. No. 9,617,721.

(51) Int. Cl.
| | |
|---|---|
| *B65G 67/30* | (2006.01) |
| *F23G 7/10* | (2006.01) |
| *B60P 1/04* | (2006.01) |
| *F23G 5/00* | (2006.01) |
| *A47K 11/02* | (2006.01) |

(Continued)

(52) U.S. Cl.
CPC ............. *F23G 7/10* (2013.01); *A47K 11/02* (2013.01); *B60P 1/04* (2013.01); *F23G 5/00* (2013.01); *E03F 1/002* (2013.01); *E03F 11/00* (2013.01); *F23G 2200/00* (2013.01); *Y02E 20/12* (2013.01)

(58) Field of Classification Search
CPC ......... E04F 17/10; E04F 17/12; B65F 1/0093; E03F 1/002; A47K 11/02
See application file for complete search history.

(56) References Cited

U.S. PATENT DOCUMENTS

| 96,767 A | 11/1869 | Baird |
|---|---|---|
| 109,276 A | 11/1870 | Vanderveer |
| 258,006 A | 5/1882 | Behrens |
| (Continued) | | |

FOREIGN PATENT DOCUMENTS

| WO | WO2005/054594 | 6/2005 |
|---|---|---|
| WO | WO2006/118578 | 11/2006 |

OTHER PUBLICATIONS

"Bedding Materials," adapted from Dairy Housing and Equipment Handbook, Midwest Plan Service, Publication No. 7, 1985.

(Continued)

*Primary Examiner* — Michael McCullough
*Assistant Examiner* — Mark Hageman
(74) *Attorney, Agent, or Firm* — Workman Nydegger

(57) ABSTRACT

A system for transporting and collecting bio-waste without the use of water as a carrier of the bio-waste is disclosed. The system comprises a plurality of bio-waste carts configured to receive and transport bio-waste along a plurality of predefined pathways to a central chute. The system further comprises a bio-waste depository associated with the central chute. The system further comprises a transport system comprising a plurality of locomotive devices configured to advance and return the plurality of bio-waste carts along predefined pathways and through tunnel-like structures to and from the central chute.

20 Claims, 14 Drawing Sheets

(51) Int. Cl.
*E03F 1/00* (2006.01)
*E03F 11/00* (2006.01)

(56) References Cited

U.S. PATENT DOCUMENTS

| | | | |
|---|---|---|---|
| 464,197 A * | 12/1891 | Landphear | A47K 11/02 193/18 |
| 591,582 A * | 10/1897 | Anthony | A47K 11/02 4/111.6 |
| 677,141 A * | 6/1901 | Rice | A47K 11/02 4/111.6 |
| 3,540,495 A * | 11/1970 | Lundgren | B30B 9/3075 100/215 |
| 3,564,618 A | 2/1971 | Williams | |
| 3,665,522 A | 5/1972 | Backlund et al. | |
| 3,906,874 A | 9/1975 | Jaronko et al. | |
| 3,908,336 A | 9/1975 | Forslund | |
| 4,013,551 A * | 3/1977 | de Feudis | B65F 1/0093 193/34 |
| 4,902,482 A | 2/1990 | Faust | |
| 4,999,857 A | 3/1991 | Mohrman | |
| 5,068,926 A | 12/1991 | Suzuki | |
| 5,183,293 A | 2/1993 | Julian | |
| 5,253,766 A * | 10/1993 | Sims | B07C 7/00 193/2 A |
| 5,720,438 A | 2/1998 | Devine et al. | |
| 5,832,623 A | 11/1998 | Nagumo et al. | |
| 5,879,221 A | 3/1999 | Barton et al. | |
| 5,901,385 A | 5/1999 | Nian | |
| 5,944,607 A | 8/1999 | Crane | |
| 5,960,710 A | 10/1999 | Holtom | |
| 6,081,940 A | 7/2000 | Nien | |
| 6,196,240 B1 * | 3/2001 | Liao | B08B 9/0826 134/144 |
| 6,264,528 B1 | 7/2001 | Doan et al. | |
| 6,335,192 B1 | 1/2002 | Östbo | |
| 7,073,212 B1 | 7/2006 | Moffat | |
| 7,144,550 B2 | 12/2006 | Devine et al. | |
| 7,216,376 B2 | 5/2007 | Samuels | |
| 8,092,141 B2 | 1/2012 | Curotto et al. | |
| 8,266,739 B2 | 9/2012 | Schaaf | |
| 8,719,973 B2 * | 5/2014 | Miner | A47K 11/02 4/460 |
| 8,769,734 B2 | 7/2014 | Schaaf | |
| 2005/0114993 A1 | 6/2005 | Schaaf | |
| 2005/0210573 A1 | 9/2005 | Schaaf | |
| 2008/0087717 A1 | 4/2008 | Schaaf | |
| 2008/0222785 A1 | 9/2008 | Irizarry-Lugo | |
| 2014/0321953 A1 | 10/2014 | Schaaf | |

OTHER PUBLICATIONS

Beder, S., "Early Environmentalists and the Battle Against Sewers in Sydney," Royal Australian Historical Society Journal, Jun. 1, 1990, vol. 76, No. 1, pp. 27-44, as published online at <http://www.uow.edu.au/arts/sts/sbeder/sewage/history.html>, pp. 1-10.
"Biomass for Energy," as published at <http://www.bbc.co.uk/nature/plants/features/185index.shmtl>, pp. 1-2.
"Biomass Power," U.S. Department of Energy—Energy Efficiency and Renewable Energy, Distributed Energy Program, as published at <http://www.eere.energy.gov/de/basics/der_basics_dertech_pwr_ren_bio.shtml>, pp. 1-4.
Brand, J., "Water, water everywhere . . . and not a drop to drink," reposted from The Yellow Times, Dec. 16, 2002, as published online at CommUnity of Minds <http://solutions.synearth.net/2002/12/16>, pp. 1-5.
Cellulose Insulation <http://www.greenresourcecenter.org/MaterialsSheets/CelluloseInsulation.html>, pp. 1-3.
"Chapter 4: Water Management Options," as published at <http://www.sustainablenc.org/thewaytogo/water/chap_4.htm>.
"Chapter 7—The future of renewable biological energy systems," as published at <http://www.fao.org/docrep/w7241e/w7241e0i.htm> pp. 1-10.
"Chapter 10: Biomass Energy," as published at <http://www.energyquest.ca.gov/story/chapter10.html>, pp. 1-2.
"Chapter 17: Renewable Energy vs. Fossil Fuels," as published at <http://www.energyquest.ca.gov/story/chapter17.html>, pp. 1-2.
"Chapter three: The raw materials of biogas digestion," as published at <http://mng-unix1.marasconewton.com/peaceorps/Documents/R0048/r0048e/r0048e05.htm>, pp. 1-8.
Clivus Multrum Composting Toilets <http://www.clivus.com>.
"Colloids," published by Facts on File, Inc., 1998, pp. 1-4.
"Composting Toilets: A Tankful of Conservation," Home Energy Magazine Online Jan./Feb. 1996, as published at <http://hem.dis.anl.gov/eehem/96/960106.html>, pp. 1-4.
"Corn Stover for Bioethanol—Your New Cash Crop?" produced by the National Renewable Energy Laboratory, a U.S. Department of Energy National Laboratory, Feb. 2001.
Cotuit Dry Toilets <http://www.cape.com/cdt/cutaway.html>.
Couch, C., "Eco Dorm Water Analysis," as published online at Eco Dorm <http://www.uidaho.edu/ecodorm/waterreport.html> pp. 1-15.
D'Vour Absorbent Powder, Lemon <http://www.biz4usa.com/cgi-bin/miva?Merchant2/merchant.mv+Screen=PROD&Store_Code=SEJS&Product_Code=BGD166>.
"Dyn-O-Mat Promises Clear Skies . . . New storm-fighting product dissipates clouds," as published online at <http://www.anomalies-unlimited.com/Chemtrails/Dyn-O-Gel.html>, pp. 1-3.
Envirolet Composting Toilets <www.envirolet.com>.
"Every Drop Counts," Reeves Journal, Dec. 14, 2000, as published at <http://www.reevesjournal.com/rj/cda/articleinformation/coverstory/bnpcoverstoryitem/0,,16621,00+en-uss_01dbc.html>, pp. 1-4.
Falcon WaterFree Technologies <http://www.falconwaterfree.com>.
"Fun with Diapers Hygroscopic Chemicals," as published at <http://www.wcsscience.com/diaper/fun.html>, pp. 1-3.
Garden State Environews <http://www.gsenet.org/library/11gsn/1999/gs90704-.php>.
Israelsen, B., "Jordan Valley Offers Toilets as Cheap Way to Save Water" Salt Lake Tribune, Sep. 2, 2002, as published online at Salt Lake Tribune <http://www.sltrib.com/2002/sep/09022002/utah/767489.htm>, pp. 1-3.
Judge, T., "Kvaerner Joins Masada Oxynol Team to Build New York Garbage-To-Ethanol Plant," as published online at Masada OxyNol <http://www.masada.com/kvaerner.html> pp. 1-2.
Kirsner, S., "Breakout Artist," as published at <http://www.wired.com/wired/archive/8.09/kamen.html>, pp. 1-9.
"Low Flow Toilets," U.S. Environmental Protection Agency, Water Use Efficiency Program, as published as <http://www.epa.gov/OW-OWM.html/water-efficiency/toilets.htm> pp. 1-3.
"Motorized Vacuum Refuse Collection System," as published at <http://nett21.gec.jp/JSIM_DATA_/WASTE/WASTE_1/html/Doc_350.html>, pp. 1-3.
Ostrowski, J., "Ecotecture—The Language for Ecological Homes," Environmental Design+Construction, as published online at Environmental Design+Construction <http://www.edcmag.com/edc/cda/articleinformation/coverstory/bnpcoverstoryitem/0,,19439,00+en-uss_01dbc.html>, posted Jan. 25, 2001, pp. 1-12.
"Phoenix Composting Toilet Sets New Standard," Environmental Building News, Jun. 1998, as published at <http:www.compostingtoilet.com/LITRACK/Articles/ebuild.htm> pp. 1-3.
Reddy, A., et al., "Chapter 8: Community Biogas Plants Supply Rural Energy and Water: The Pura Village Case Study," as published online at UNDP <http://www.undp.org/seed/energy/policy/ch_8.htm>, pp. 1-14.
"Refuse Capsuled Transportation System," as published at <http://nett21.gec.jp/CTT_DATA_/WASTE/WASTE_1/html/Waste-022.html>, pp. 1-2.
"Refuse Vaccum Sealed Conveyance System," as published at <http://nett21.gec.jp/CTT_DATA_/WASTE/WASTE_1/html/Waste-021.html>, pp. 1-2.
"Renewable Energy Technologies," as published at <http://www.rentec.ca/biogas_turnkey%20solutions.htm>, pp. 1-2.
"Renewable Energy Technologies Biogas Economics," as published at <http://www.rentec.ca/biogas_economics.htm>, pp. 1-2.

(56) References Cited

OTHER PUBLICATIONS

"Renewable Energy Technologies: Biogas FAQ," as published at <http://www.rentec.ca/FAQ.htm>, pp. 1-8.
"Robot for Working in Small-Diameter Piping," Toshiba, Feb. 21, 1997, as published at <http://www.toshiba.co.jp/about/press/1997_02/pr2101.htm>, pp. 1-2.
"Robot to clear garbage," The Hindu, Thursday, Jul. 5, 2001, as published at <http://www.hinduonnet.com/thehindu/2001/07/05/stories/14052187.htm>, pp. 1-2.
Roboter Info. http://www.roboter-info.de/englisch/einfuehrung.html.
"Robots," Siemens Webzien, as published at <http://w4.siemens.de/Ful/en?archiv/pof/heft2_02/artikel26/>, pp. 1-2.
"Saving Water," as published at <http://www.here4business.co.uk/blny/environment/water.asp>, pp. 1-2.
"ScienceDaily News Release: Pets May Be Major Cause of Water Pollution in Urban Areas," adapted from a news release issued by Vanderbilt University, as published at <http://www.sciencedaily.com/releases/1999/12/991206071651.html> pp. 1-2.
"ShinMaywa Vacuum Type Refuse Collecting and Transporting System 'TECHNOUUM'," as published at <http://nett21.gec.jp/JSIM_DATA_/WASTE/WASTE_1/html/Waste-011.html>, pp. 1-4.
"Simple Methods for the Treatment of Drinking Water," as published at <http://www.ces.iisc.ernet.in/energy/water/paper/drinkingwater/simplemethods/treatment.html>, pp. 1-5.
The Original OutBack Pack < http://www.outbackpack.com>.
"Waste Management System for High-rise Building (FUSWTON)," as published at <http://nett21.gec.jp/JSIM_DATA_/WASTE/WASTE_1/html/Doc_348.html>, pp. 1-4.
"Waste Pneumatic Transportation System," as published at <http://nett21.gec.jp/JSIM_DATA_/WASTE/WASTE_1/html/Waste-025.html>, pp. 1-2.
"Water for a Thirsty City," as published at <http://www.sheilaforcouncil.com/issues/water.htm>, pp. 1-2.
Waterless Urinals <http://www.brookwater.co.uk/Aridian-Water-Less_Urinals.htm>.
"WTE," as published at <http://www.wte.org/energy.html>, pp. 1-3.
U.S. Appl. No. 10/725,217, Nov. 18, 2005, Office Action.
U.S. Appl. No. 10/725,217, Mar. 30, 2006, Office Action.
U.S. Appl. No. 11/119,842, Feb. 11, 2008, Office Action.
U.S. Appl. No. 11/119,842, Jul. 14, 2008, Office Action.
U.S. Appl. No. 11/537,470, Jun. 23, 2008, Office Action.
U.S. Appl. No. 11/932,983, Jul. 20, 2011, Office Action.
U.S. Appl. No. 11/932,983, Feb. 3, 2012, Office Action.
U.S. Appl. No. 11/932,983, May 17, 2012, Notice of Allowance.
U.S. Appl. No. 13/353,031, Aug. 24, 2012, Office Action.
U.S. Appl. No. 13/353,031, Dec. 20, 2012, Office Action.
U.S. Appl. No. 13/353,031, Jul. 17, 2013, Office Action.
U.S. Appl. No. 13/353,031, Feb. 28, 2014, Notice of Allowance.

\* cited by examiner

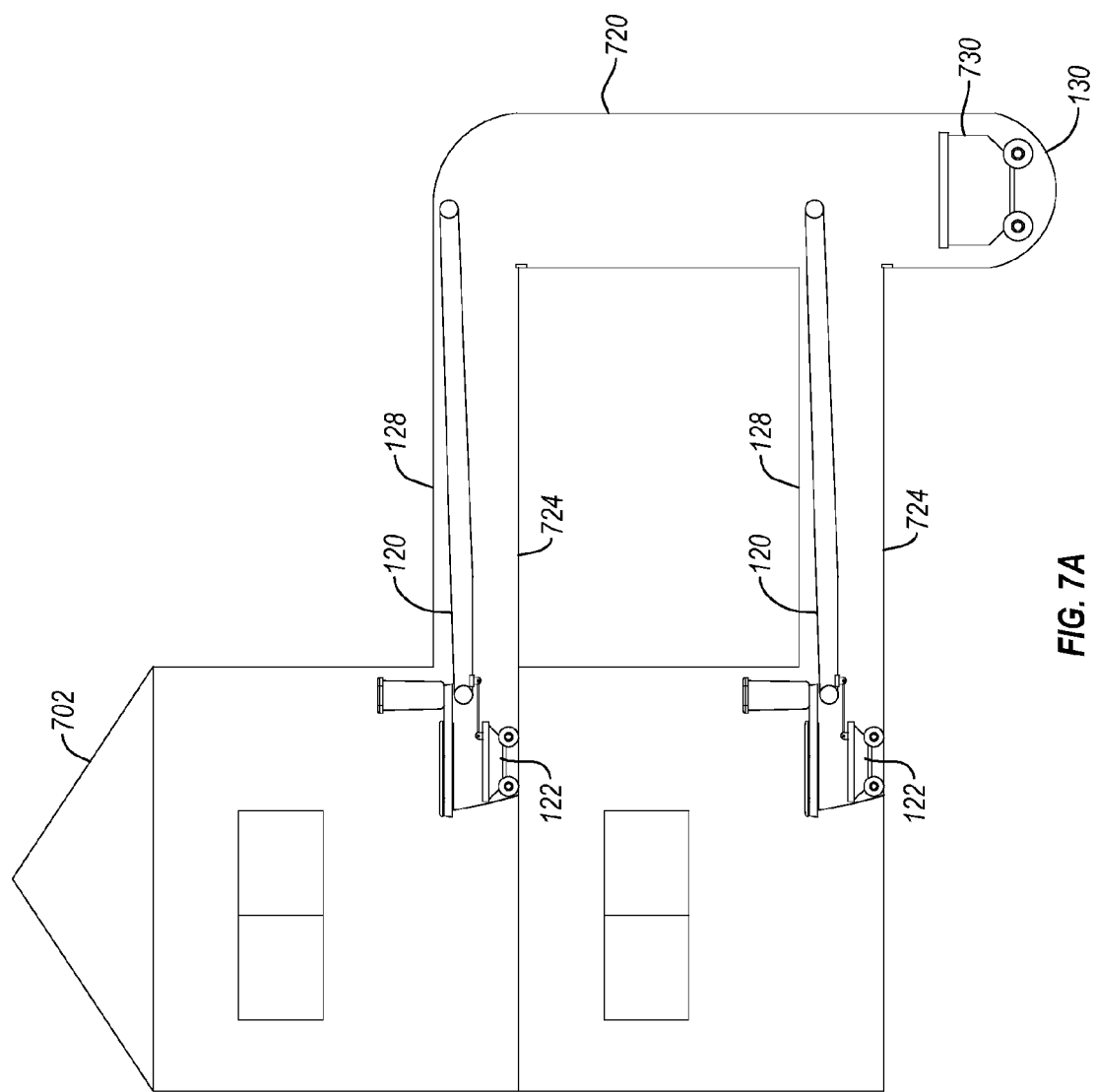

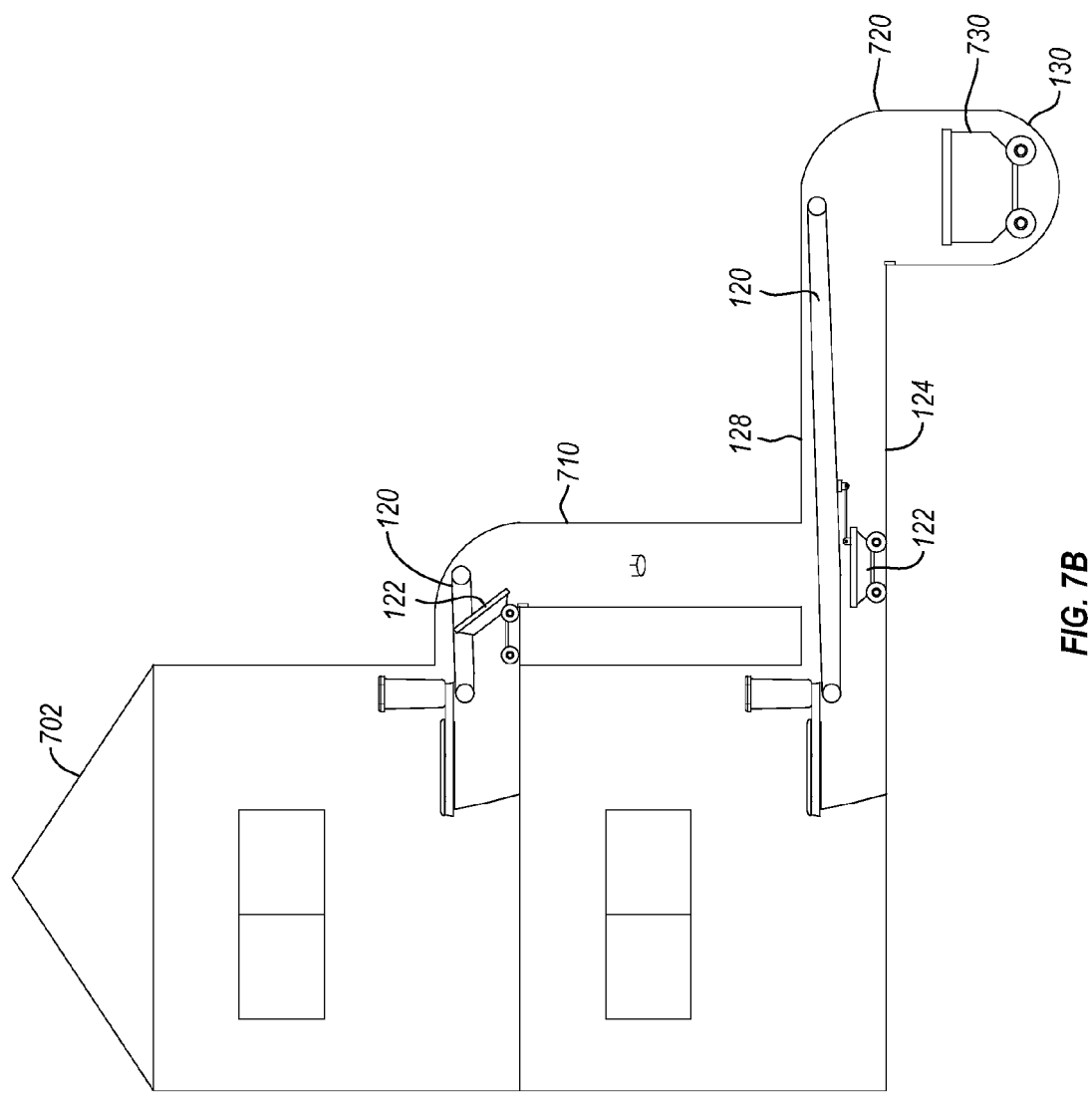

SYSTEMS AND METHODS FOR TRANSPORTING AND COLLECTING BIO-WASTE

CROSS-REFERENCE TO RELATED APPLICATIONS

This application is a continuation-in-part of and claims priority to U.S. application Ser. No. 14/531,297, filed Nov. 3, 2014, and entitled SYSTEMS AND METHODS FOR TRANSPORTING BIO-WASTE, which is incorporated herein in its entirety by reference.

BACKGROUND

1. Technical Field

The present disclosure relates generally to the conservation of natural resources. Specifically, the present disclosure is generally directed to the transportation and disposal of bio-waste that would traditionally use water as a carrier medium.

2. Background and Relevant Art

The world we inhabit contains many natural resources utilized by man for myriad purposes. Historically, the availability and control of natural resources such as fossil fuels, timber, and fresh water have shaped empires and aided in the establishment of world economic powers. This holds true today where the control and use of natural resources is the subject of armed conflicts, economic negotiations, and political divisions, all because we are collectively dependent upon the planet's natural resources. For example, developed nations rely, at least somewhat, on fossil fuels to generate the electricity necessary to power computers and electronics which are integral to maintaining their society's function and status quo, and undeveloped countries are no less dependent upon the planet's natural resources, even if in different ways. While the relative importance of some natural resources may be based on a nation's developmental, geographic, or climatic circumstances, no nation or individual can escape a dependence upon one natural resource in particular—clean, fresh water. And as the human population on Earth swells there is a concomitant increase in the demand and use of all natural resources. Accordingly, there is an impetus for conserving natural resources—especially clean, fresh water—to promote their non-exhaustive use.

Clean, fresh water is required for sustaining life. It is needed as drinking water, it is required to cultivate crops, and it can be used for bathing or otherwise maintaining a sanitary lifestyle. Clean, fresh water is an essential, yet finite, natural resource, and in light of the expanding world population and our dependency on water to provide for our essential needs, approaches to conserving this natural resource may include reexamining our current uses of this precious resource.

Currently, gravity-driven bio-waste disposal systems utilize water as a medium for carriage of the bio-waste. It is an energy efficient process but an inefficient use of clean, fresh water. Toilet manufacturers have taken modern approaches to limiting the total volume of water used per flush, but clean, fresh water still remains as the carrier of bio-waste. Significant amounts of water could be conserved if alternative bio-waste disposal systems were employed at a higher frequency. Unfortunately, current alternatives are outpaced by social norms and the convenience of traditional flush toilets.

To compound the problem of soiling clean, fresh water through the use of traditional flush toilets for bio-waste disposal, some homes or other structures utilize septic systems, which can taint the otherwise pure groundwater. Septic systems are notoriously difficult to properly maintain without causing groundwater pollution. Septic tanks may potentially leak, and because they are almost always stored underground, a structurally compromised septic tank results in concentrated bio-waste being released directly into or within proximity of groundwater. This now polluted groundwater is a danger if used as a potable water source, but it is also an extreme waste of the planet's limited and precious fresh water supply.

Leach fields associated with septic systems may also be problematic in the contamination of groundwater. In an attempt to remove contaminants and impurities from the liquid that emerges from the septic tank, leach fields may cause the inadvertent contamination of the treasured, local fresh groundwater due to improper construction or hazardous proximity to a groundwater source. As a combined solution to bio-waste disposal, septic tanks and leach fields create more problems than they solve and can potentially contaminate more fresh water than traditional flush toilets attached to a common sewage line.

Some parts of the world lack access to traditional flush toilets—whether attached to a septic system or a sewage line—and instead practice open air defecation. In these communities, the practice of open air defecation pollutes clean, fresh water sources, contributes to the transmission of life-threatening diseases such as cholera, and degrades the decency of individuals forced to practice this method of bio-waste disposal. At the least, pollution of fresh water sources as a result of open air defecation can cause prolific diarrhea, putting an additional strain on the precious fresh water supply as diarrheic individuals struggle to be adequately hydrated in the face of regular, high volume expulsion of body fluid. Open air defecation is a real and present danger in many areas of the world and places an additional undue burden on our world's limited supply of fresh, clean water.

Outhouses or similar portable commodes are perhaps one of the simplest applications of bio-waste disposal systems that mitigate some of the consequences of open air defecation and do not require water as a bio-waste carrier medium. There are, however, some disadvantages associated with outhouses. Perhaps foremost are the inconveniences associated with its traditional implementation as an outdoor commode situated directly above a bio-waste depository. In this configuration, each subsequent user is directly subjected to the fetid odors of previously deposited bio-waste continually piled in a heap of putrefying effluent directly below their person. This can potentially dissuade users.

Additionally, outhouses are traditionally detached from residences; this can create issues of personal safety and inconvenience. Nature may call at any hour during any season. Traversing the territory between a person's residence and the outdoor commode could prove treacherous during inclement weather conditions, if not only inconvenient, and depending on the geographic location, an unpleasant or dangerous encounter with wild animals is also possible, especially in more rural areas. Also, outhouses traditionally rely on holes dug into the ground to cache deposited bio-waste. This practice may lead to ground water contamination and consequently, the spread of disease. While outhouses or similar portable commodes do not use water as a carrier medium and may be a viable alternative to flush toilets for conserving clean, fresh water, their use is only marginally removed from the unsanitary and life-threatening practice of open air defecation. There are certainly distinct drawbacks associated with the use of traditional outhouses or portable commodes.

Accordingly, there are a number of disadvantages in the art of natural resource conservation that can be addressed.

BRIEF SUMMARY

Implementations of the present disclosure comprise systems and methods that aid in the conservation of natural resources. In particular, implementations of the present disclosure comprise methods and systems for alleviating the need for water as a carrier medium for bio-waste disposal by facilitating bio-waste removal mechanically. Additionally, implementations of the present disclosure can promote the recycling of bio-waste such that it may be utilized as an energy source.

For example, systems and methods are provided that replace water as a carrier medium for bio-waste with mechanical work to dispose of—and in some embodiments, recycle—the bio-waste. Through interactions with an indoor bio-waste receptacle, bio-waste may be received at a bio-waste cart, which can then be translocated along a predefined pathway or a plurality of predefined pathways. The work used to move the bio-waste cart may be provided by a manually operated crank. In at least one embodiment, the bio-waste can be delivered to a bio-waste depository that may be in a subterranean element for storage or recycling. The bio-waste cart may then be returned to the bio-waste receptacle through work again provided by the manually operated crank.

In at least one embodiment of the present disclosure, the bio-waste depository accepting deposited bio-waste may be an apparatus for converting the bio-waste into an energy source. This may include incinerating the bio-waste and converting the resulting thermal energy into mechanical or electrical energy. In another embodiment, the bio-waste may be decomposed by microbes where the resulting gases are collected and used as a combustible energy source. Alternatively, the collected bio-waste may be recycled into fertilizer for crops.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 7A illustrates possible configurations of a plurality of predefined pathways and tunnel-like structures according to implementations of the present disclosure.

FIG. 7B illustrates possible configurations of a plurality of predefined pathways and tunnel-like structures according to implementations of the present disclosure.

DETAILED DESCRIPTION

Implementations of the present disclosure extend to systems and methods that aid in the conservation of natural resources. In particular, implementations of the present disclosure comprise methods and systems for alleviating the need for water as a carrier medium for bio-waste disposal by facilitating bio-waste removal mechanically. Additionally, implementations of the present disclosure can promote the recycling of bio-waste such that it may be utilized as an energy source.

Accordingly, implementations of the present disclosure provide a system to dispose of bio-waste without the need for water as a carrier medium, which can act as a conservation of natural resources by reducing the total consumption and reliance on water for bio-waste transportation and disposal. Further, implementations of the enclosed disclosure can promote a safer and more hygienic alternative to traditional portable commodes or outhouses. The systems and methods described herein make it possible to more easily, safely, and hygienically transfer and deposit bio-waste.

Existing technologies are not well-equipped to deal directly with water conservation efforts and societal norms or preferences. Traditional indoor flush toilets have become the societal norm but continue to utilize water as a carrier of bio-waste, whereas other existing technologies such as outhouses or portable commodes do not use water as a carrier of the bio-waste but are generally outside of the societal norm and preference. The aforementioned outdoor facilities are likely to be odorous and unhygienic and are less likely to be embraced as an alternative. Implementations of the present disclosure alleviate the negative connotations associated with using an outdoor facility while simultaneously embracing societal expectations and promoting the conservation of clean, fresh water. Embodiments of the present disclosure are likely to significantly decrease bio-waste odors given the geographical separation of the bio-waste receptacle and the bio-waste depository or subterranean element containing the bio-waste. Additionally, the social norm of using an indoor commode can be esthetically maintained in embodiments of the present disclosure while still adhering to a conservation-friendly waterless bio-waste disposal system.

Figure 1:
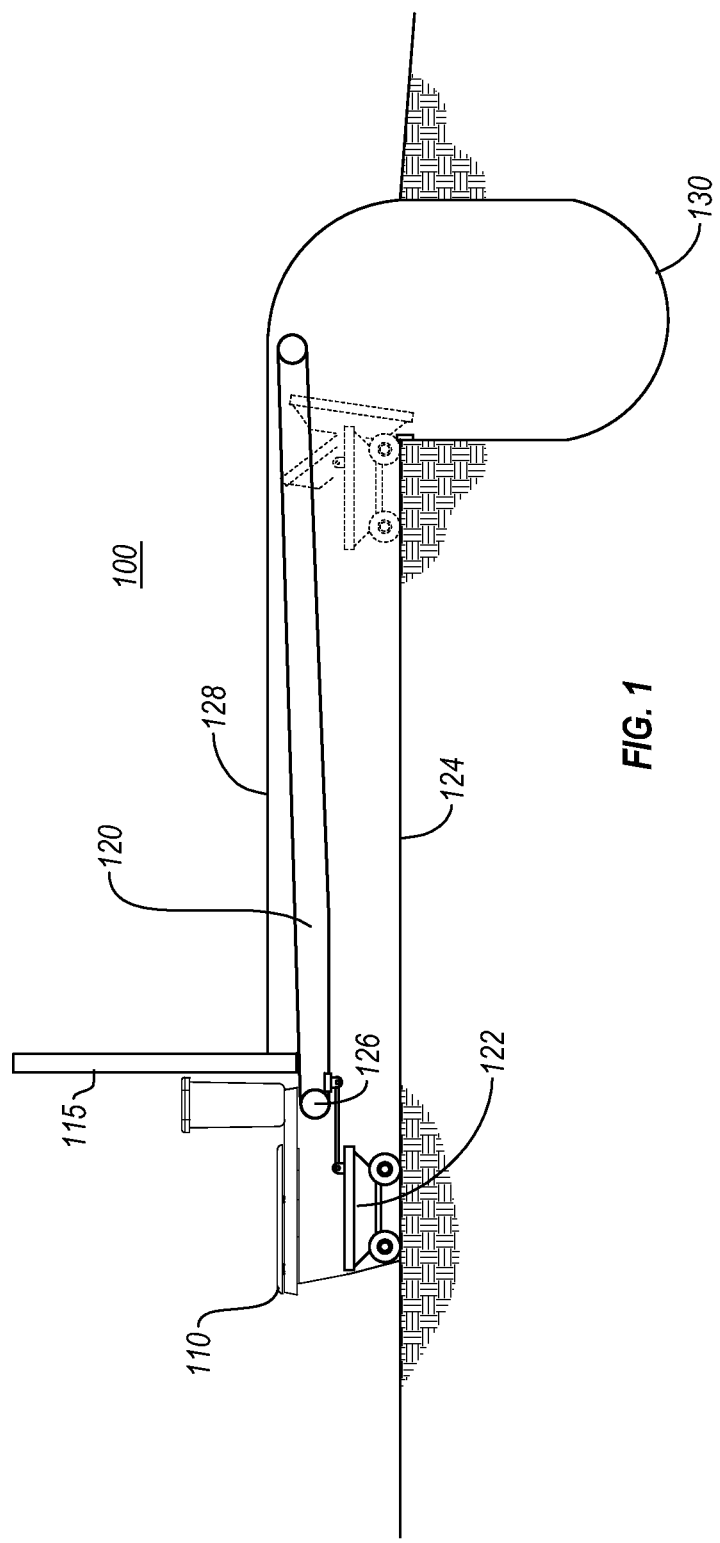
FIG. 1 illustrates a schematic representation of a system for transporting bio-waste according to one implementation of the present disclosure.

For example, FIG. 1 illustrates a schematic representation of a system 100 for transporting bio-waste according to one implementation of the present disclosure. The system 100 comprises a bio-waste receptacle 110 associated with the interior portion of an exterior wall 115 of a structure. The bio-waste receptacle 110 is, therefore, indoors, whether as part of a residential structure such as a house or apartment or as part of a commercial structure such as a business or place of employment. In at least one embodiment, the exterior wall 115 may be part of a portable commode such as a port-o-potty or outhouse. In one embodiment, system 100 may be used as an alternative to a septic system.

In at least one embodiment of the present disclosure, at least a portion of the substantially upward facing surface of the bio-waste receptacle 110 is configured to receive bio-waste. Further, the bio-waste receptacle 110 may have an opening on at least one side to allow a bio-waste cart 122 to enter and exit the bio-waste receptacle. In one embodiment, the opening will be positioned at the rear of the bio-waste receptacle 110, and the bio-waste cart may enter and exit the otherwise enclosed lower portion of the bio-waste receptacle 110 via said opening.

Figure 2:
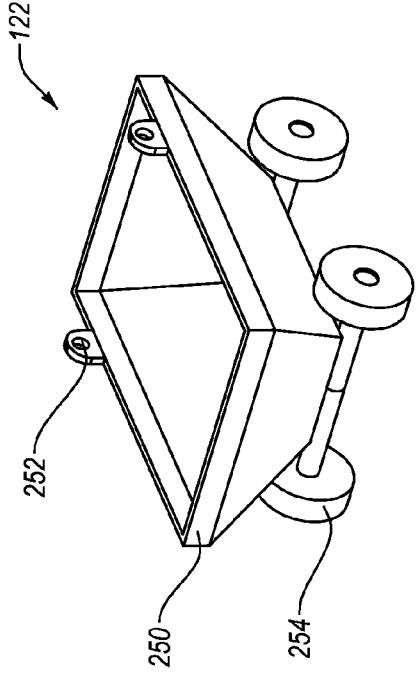
FIG. 2 illustrates an exemplary bio-waste cart according to one implementation of the present disclosure.

In at least one embodiment, such as that illustrated in FIG. 2, the bio-waste cart 122 comprises a collection bucket 250 for receiving and carrying the bio-waste. The collection bucket may be pivotally attached to a base 254 having a plurality of wheels for transporting the collection bucket. In at least one embodiment, the plurality of wheels 254 are configured to ride on rails. Optionally, the interior of the collection bucket 250 may support a liner to receive the bio-waste. The optional liner would provide physical separation from the bio-waste and the interior surface of the collection bucket 250. In at least one embodiment, the optional liners may be comprised of plastic or a biodegradable product that functions in a substantially similar capacity. Further, the optional liners may contain absorbent materials such as sawdust or other organic material that will absorb fluid contained in the deposited bio-waste and may also act to assist in the decomposition, incineration, or recycling of the bio-waste.

The bio-waste cart 122 may also comprise attachment elements 252 for connecting the bio-waste cart 122 to a transport system 120 (FIG. 1) used for bio-waste cart 122 locomotion. In at least one embodiment of the present disclosure, the transport system 120 may comprise a cable mounted about spaced apart pulleys, one of which is adjacent to the bio-waste receptacle 110 and one of which is adjacent to the subterranean element 130. The bio-waste cart 122 may be connectably attached to the cable of the transport system 120 by, for example, a bar or cord fixedly attached to the cable on one end and the attachment elements 252 of the bio-waste cart 122 on the other. For example, FIG. 1 illustrates how the attachment elements 252 connect the bio-waste cart 122 to the transportation system 120. The transport system 120 may also include a manually operated locomotive device 126 for translocating the bio-waste cart 122 along a predefined pathway 124.

Applying work to the manually operated locomotive device 126 of transport system 120 causes the bio-waste cart 122 to move along the predefined pathway 124. Work may be applied to the manually operated locomotive device 126 in myriad ways. In one embodiment, work can be applied to the manually operated locomotive device 126 using a hand operated crank. The rotational force directed through the hand operated crank could directly or indirectly cause the rotation of a pulley, consequently driving an associated cable and the attached bio-waste cart 122 along the predefined pathway 124. In yet other embodiments, systems of gears, pulleys, or springs may translate a user-applied unidirectional force into forces necessary for driving the bio-waste cart 122 along the predefined pathway 124. For example, in one embodiment a manually operated locomotive device 126 may comprise a spring loaded rod connected on one end to a pulley, with the other end attached to a length of cord that is wrapped circumferentially around the spring loaded rod. The user may apply work to the manually operated locomotive device 126 by grasping the cord or another object attached thereto and exerting a directional force away from the spring loaded rod. As the cord becomes unraveled, it may cause the rotational movement of the pulley to drive a cable and attached bio-waste cart 122 along the predefined pathway 124.

In the illustrated embodiment of FIG. 1, the predefined pathway 124 is sheltered by a tunnel-like structure 128 that is associated with the exterior side of the exterior wall 115 of the structure and follows the predefined pathway 124. As the bio-waste cart 122 traverses the predefined pathway 124, the tunnel-like structure 128 does not obstruct its movement but shields the bio-waste cart 122 from the external environment, tampering, and any interference that may result therefrom. The tunnel-like structure 128 also protects the mechanisms of the transportation system 120 (e.g., the pulley system) and may also act as an anchor for said mechanisms in at least one embodiment of the present disclosure.

While FIG. 1 depicts a pulley system in the transportation system for moving the bio-waste cart 122, one will understand the characterization (e.g., location and interaction) of the transportation system is somewhat arbitrary. In at least one implementation, the transportation system 120 of FIG. 1 may be combined, divided, or organized in configurations other than that which is shown. As used herein, the exact placement of individual components of the transportation system 120 are provided for the sake of clarity and explanation and are not intended to be limiting. In at least one embodiment, the overhead pulley system may be replaced by an overhead rail system or by a rail system placed beneath the bio-waste cart 122. In the latter, the placement of at least the manually operated locomotive device 126 may be adjusted accordingly. Additionally, while the bio-waste cart 122 and the transportation system 120 are shown and described as being manually operated, it will be appreciated that an automated or semi-automated (e.g., motorized) bio-waste cart 122 and/or transportation system 120 may be employed to transport the bio-waste from the bio-waste receptacle 110 to the subterranean element 130.

Figure 3:
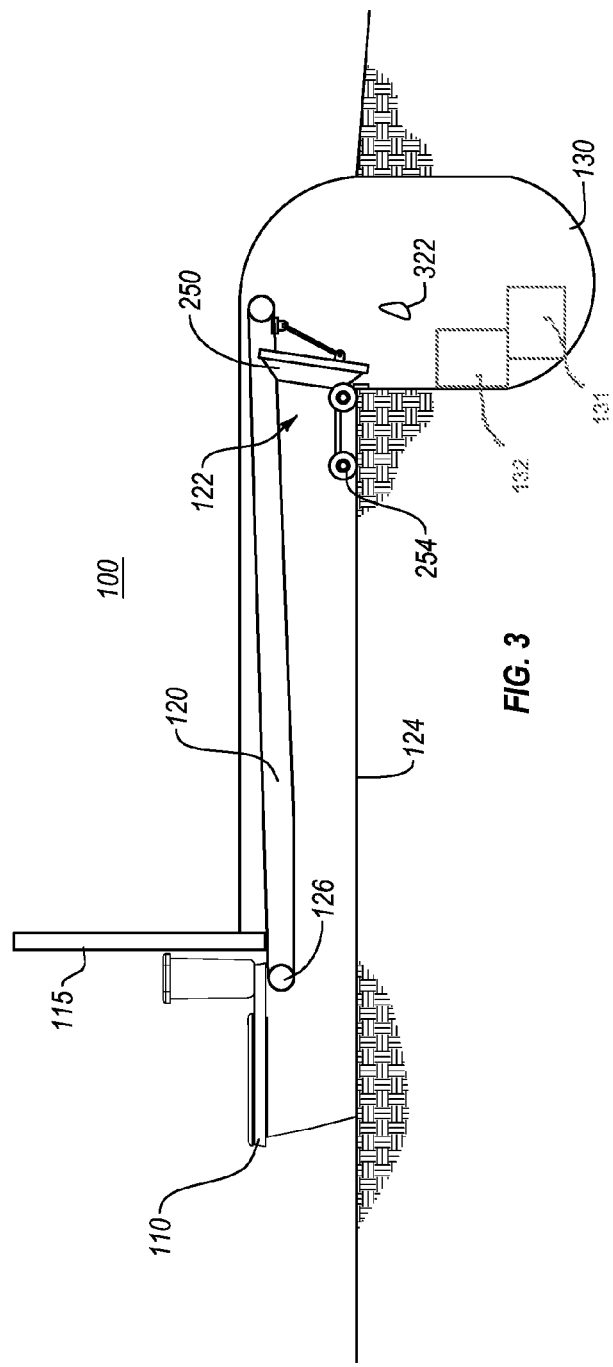
FIG. 3 illustrates a schematic representation of a system for transporting and disposing bio-waste according to one implementation of the present disclosure.

FIG. 3 illustrates a schematic representation of system 100 for transporting and disposing bio-waste according to at least one implementation of the present disclosure. For example, applying work to the manually operated locomotive device 126 moves the bio-waste cart 122 along the predefined pathway 124 until it arrives at the subterranean element 130, wherein the bio-waste cart 122 dumps its contents 322 within the subterranean element 130. The act of dumping the contents of the bio-waste cart 122 may be initiated as the base 254 of the bio-waste cart 122 is restrained from moving forward by an obstruction on the predefined pathway 124. The pivotally mounted collection bucket 250 can be acted upon by the transportation system 120 to be at least partially inverted, causing the deployment of its contents into the subterranean element 130.

In at least one embodiment of the present disclosure, the transportation system 120 for moving the bio-waste cart 122 along the predefined pathway 124 may be distinct from the transportation system for moving the bio-waste cart 122 along a separate predefined pathway. Accordingly, the manually operated locomotive device 126 may provide the work required to translocate the bio-waste cart 122 along the predefined pathway 124 of the transportation system 120, whereas a separate manually operated locomotive device may provide the work required to translocate the bio-waste cart 122 along a predefined pathway to the collection receptacle 110. It should be appreciated that the aforementioned embodiments of transport systems are exemplary and provided for the sake of explanation and are not intended to be limiting.

In at least one embodiment, the subterranean element 130 for receiving the transported bio-waste may comprise an earthen pit. An earthen pit, as described herein is intended to include man-made or naturally-occurring holes in the ground, regardless of depth. Earthen pits are not limited to dirt or earth lined holes but are meant to extend to earthen pits lined with concrete, masonry, composites or any other naturally-occurring or man-made material. An earthen pit is meant, for the purposes of this disclosure, to be along the predefined pathway 124 as a depository for bio-waste, received from the bio-waste cart 122.

In other embodiments of the present disclosure, the subterranean element 130 comprises a container 131 for recycling the bio-waste. The container 131 may include, but is not limited to a bio-digester, solar dehydrator, composter, or incinerator. For embodiments in which the subterranean element includes a bio-digester, the bio-digester may include systems that allow for the processing of bio-waste with the assistance of microbes for decomposition to produce flammable gases and/or bio-fertilizers for use on crops. These flammable gases are produced as a natural byproduct of anaerobic fermentation that occurs as a result of bacterial utilization of the nutrient dense bio-waste and can be harnessed and used as thermal energy. This thermal energy may be used to provide heat for an associated structure, for cooking, or translated into mechanical work. The mechanical work may then be used to generate electricity or for any other useful purpose (e.g., to power motorized embodiments of bio-waste cart 122 and/or transportation system 120).

In yet other embodiments, the subterranean element 130 comprises an incinerator. This may be as simple as a burn barrel where the bio-waste is deposited, collected, and routinely incinerated. In at least one embodiment, the incinerator 131 is attached to an energy generator 132. This may include, but is not limited to, a Sterling engine or similar device used to transfer thermal energy into mechanical work. The mechanical work, as noted above may also be used to create electrical energy. The aforementioned embodiments of subterranean elements 130 are meant to be exemplary and should not be construed to uncharacteristically narrow the understanding or spirit of the subterranean element 130 as described herein.

Figure 4A:
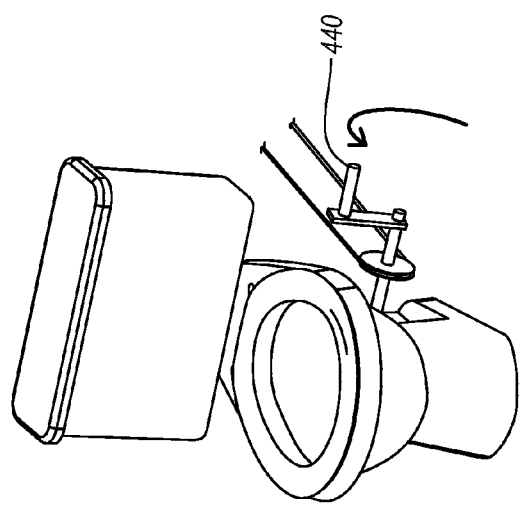
FIG. 4A illustrates a manually operated locomotive device according to one implementation of the present disclosure.
Figure 4B:
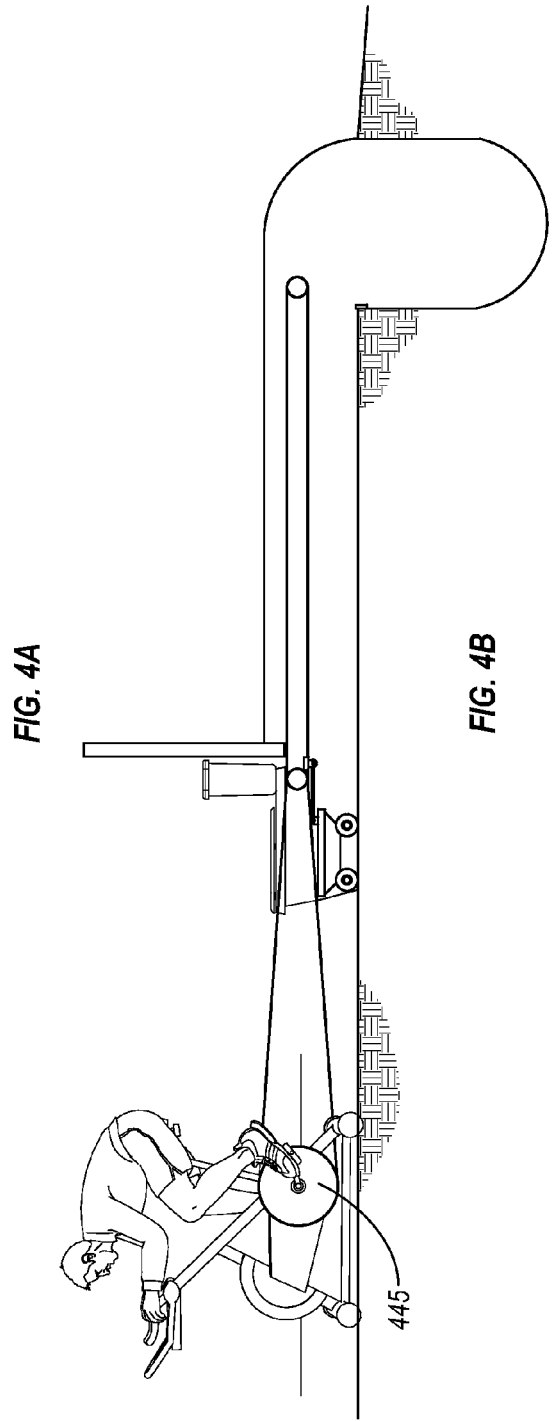
FIG. 4B illustrates a manually operated locomotive device according to one implementation of the present disclosure.

Referring now to FIGS. 4A and 4B, illustrated are examples of manually operated locomotive devices according to implementations of the present disclosure. FIG. 4A is one exemplary illustration of a hand-operated crank 440 that could be used as a manually operated locomotive device 126 in an implementation of the present disclosure. After bio-waste has been deposited into the collection bucket 250 of the bio-waste cart 122, a user applies rotational force to the hand-operated crank 440, and the bio-waste cart 122 attached to the transportation system 120 by the bio-waste cart's attachment elements 252 will be translocated along the predefined pathway 124 as long as work is applied to the hand-operated crank by said user. The bio-waste cart 122 is returned to the bio-waste receptacle 110 through the application of opposite rotational force applied to the hand-operated crank 440.

Similarly, FIG. 4B illustrates an implementation of the present disclosure where the work required for the manually operated locomotive device 126 is derived from a foot-operated crank 445. In some embodiments, the foot operated crank 445 is part of a stationary bicycle or equivalent parts as depicted in FIG. 4B. The additional force offered by a foot-operated crank 445 may be convenient if the subterranean element 130 is elevated above the bio-waste receptacle 110, at a distance, or may simply be used to expedite or ease the process of transporting the bio-waste. The aforementioned methods of providing work to translocate the bio-waste cart 126 are meant to be exemplary only, and any method of transforming said user-induced forces to the translational movement of the bio-waste cart is intended in the scope of this disclosure.

Figure 5:
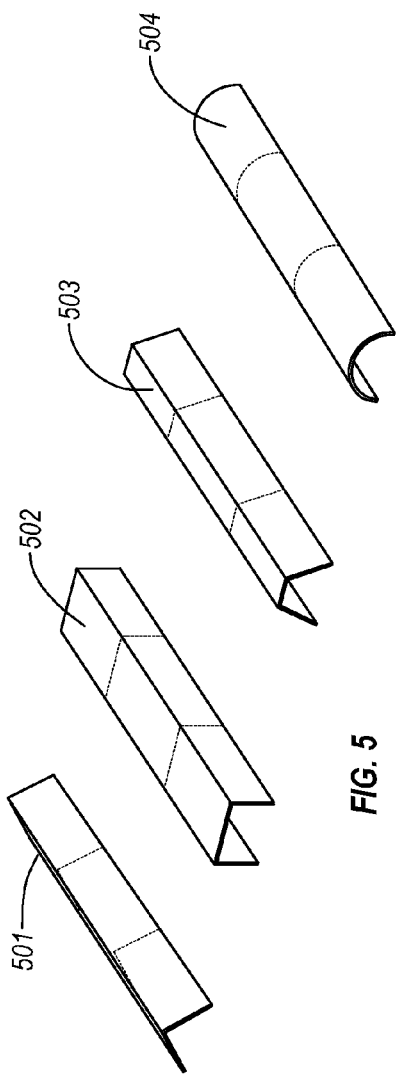
FIG. 5 illustrates exemplary geometric configurations of tunnel-like structures according to implementations of the present disclosure.

Referring now to FIG. 5, illustrated are examples of tunnel-like structures (similar to the tunnel-like structure 128 of FIG. 1) according to implementations of the present disclosure. The tunnel-like structures can have many configurations, including an A-frame 501, box 502, trapezoidal 503, or other polygonal geometries such as pentagonal, hexagonal, heptagonal, octagonal, nonagonal, decagonal, or any other reasonable polygonal geometry to accomplish the same purpose of providing an unobstructed tunnel-like area for a traversing bio-waste cart 126. Tunnel-like structures having an arcuate surface are also meant to be included in the spirit of the tunnel-like structure described herein. The tunnel-like structures may extend to any structure having a substantially arced contour, including the half-pipe 504 depicted in FIG. 5, but is also to extend to substantially spherical, hemispherical, or ovoid shapes where the bio-waste cart would be transported within the concave portion of the arcuate contour.

Figure 6:
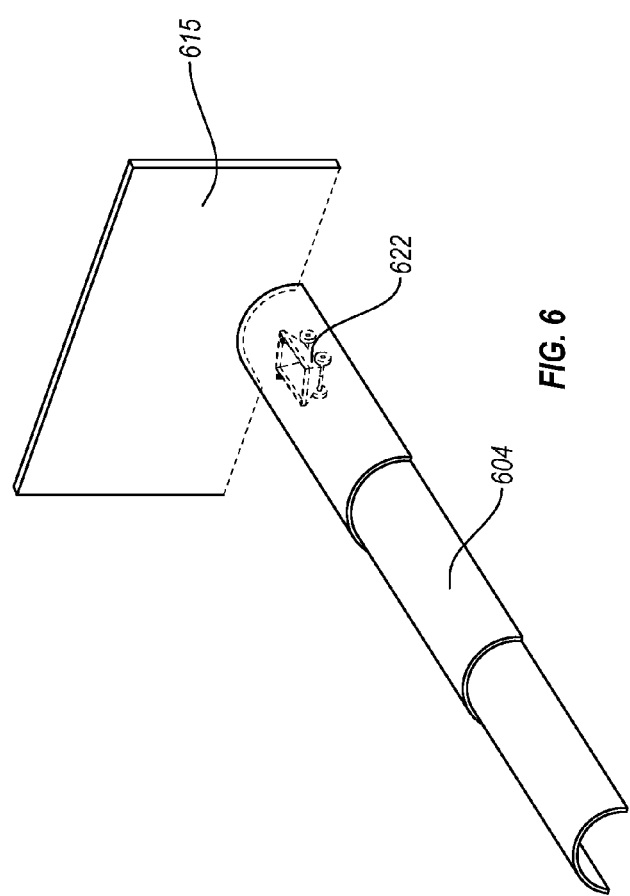
FIG. 6 illustrates a telescoping tunnel-like structure according to one implementation of the present disclosure.

Regardless of the shape of the tunnel-like structure, in at least one embodiment, the tunnel-like structure is meant to be collapsible such that the tunnel-like structure may easily lay flat, whether as by folding or by a hinged mechanism. Further, in at least one embodiment, the tunnel-like structures may be hinged or may otherwise be equipped with doors such that the enclosed pathway 124 may be accessed for maintenance or visualization. In at least one embodiment, and as depicted in FIG. 6, a collapsing tunnel-like structure 604 may collapse through a telescoping mechanism. The telescoping tunnel-like structure 604 can be segmented wherein the segments overlap one another and can be extended and retracted as needed to cover a larger or smaller geographic area with one end associated with the exterior side of a wall of a structure 615 containing the bio-waste receptacle and wherein a bio-waste cart 622 may traverse the interior of the telescoping tunnel-like structure 604 unimpeded. While FIGS. 5 and 6 illustrate potentially straight, rigid tunnel-like structures, it should be appreciated that the tunnel-like structures may be constructed to bend or move angularly from the structure to which it associates.

Referring now to FIG. 7, illustrated are example embodiments of systems for transporting and collecting bio-waste from a multi-level structure 702. In one embodiment depicted in FIG. 7A, each level of the multi-level structure 702 is associated with at least one of a plurality of predefined pathways 724, a bio-waste cart 122, a transport system 120 for translocating a bio-waste cart 122 along the plurality of predefined pathways 724, and a tunnel-like structure 128 housing each of the plurality of predefined pathways 724. In at least one embodiment, bio-waste carts 122 are attached to transportation systems 120 in a one-to-one relationship to advance and return the bio-waste carts along the plurality of predefined pathways 724 using mechanical, manually operated mechanisms. In one embodiment, the mechanical, manually operated mechanisms may include a hand-operated crank 440, a foot-operated crank 445, or similar manually-operated device.

FIG. 7A further exemplifies one embodiment of the present disclosure where bio-waste is transported from each level of the multi-level structure 702 along a plurality of predefined pathways 724 that converge at a central chute 720. The central chute 720 is associated with a bio-waste depository 730 that may, in some embodiments, rest within the subterranean element 130. In one embodiment, the central chute 720 connects each level of the multi-level structure 720 to the bio-waste depository 730 and facilitates the collection of transported bio-waste along any of the predefined pathways 724 on any level of the multi-level structure 702 to the bio-waste depository 730.

In one embodiment, the bio-waste is transported along the plurality of predefined pathways without using water as a carrier of the bio-waste. Instead, bio-waste is mechanically transported along the plurality of predefined pathways 724 in bio-waste carts 122. The bio-waste carts 122 transport bio-waste from the multi-level structure 702 through the tunnel-like structures 128 and deposit the bio-waste into the central chute 720 where it is then transferred to a bio-waste depository 730.

In one embodiment of the present disclosure, transfer of the bio-waste from the central chute 720 to the bio-waste depository 730 may occur as quickly as gravitational acceleration allows. In another embodiment, the central chute 720 may be closed on the end proximate to the bio-waste depository 730 by a door or door-like mechanism which stops deposited bio-waste before reaching the bio-waste depository 730. In such an embodiment, the closed end of the central chute 720 may act as a temporary holding site for deposited bio-waste before it is finally deposited into the bio-waste depository 730. The deposited bio-waste can then be transferred from the central chute 720 in masse to the bio-waste depository 730. This may be advantageous, for example, if the bio-waste depository 730 requires processing time. Processing time may include time to perform acts such as incinerating the bio-waste, compressing the bio-waste, dehydrating the bio-waste, generating energy from the bio-waste, and/or other similar acts.

In one embodiment, the central chute 720 is or includes a vacuum-like system that transports the bio-waste from the bio-waste cart 122 to the bio-waste depository 730 using accelerated and/or forced air. For the purposes of this disclosure, a vacuum-like system may be any system that utilizes accelerated and/or forced air to push and/or pull objects. In one embodiment, the vacuum-like system may be a system wherein the central chute 720 is at least partially vacuumized and/or sealed. In one embodiment, the bio-waste depository 730 will not be located substantially beneath the central chute 720 such that gravity alone may not be sufficient to transfer the bio-waste through the central chute 720 to the bio-waste depository 730. In such an embodiment, the vacuum-like system of the central chute 720 may promote the transfer of bio-waste through the central chute 720 to the bio-waste depository 730 by pushing and/or pulling bio-waste through central chute 720 with accelerated and/or forced air.

In one embodiment, power to run the vacuum-like system of central chute 720 may be derived from electrical energy generated from the bio-waste depository 730. This may be done, for example, by burning the bio-waste within an incinerator and using the heat generated from burning the bio-waste to generate electricity. In one embodiment the electricity can be generated through thermionic conversion and/or through converting the thermal energy to mechanical energy that can be used to generate electrical energy.

FIG. 7B, illustrates one embodiment of the present disclosure where a subset of the plurality of predefined pathways 724 may converge prior to joining with the central chute 720. In one such embodiment, bio-waste may be collected by a bio-waste cart 122 in a multi-level structure 702 and deposited through a secondary chute 710 to an awaiting bio-waste cart 122 on a lower level in the multi-level structure 702. The bio-waste cart 122 on the lower level of the multi-level structure 702 may then transport the bio-waste along a predefined pathway 124 to the central chute 720 and into the bio-waste depository 730. The bio-waste depository 730 may be contained within subterranean element 130.

In one embodiment, bio-waste deposited by the bio-waste cart 122 into the secondary chute 710 may be temporarily held by a door or door-like mechanism above the predefined pathway 124 traversed by a bio-waste cart 122 on a lower level in the multi-level structure 702. The bio-waste cart 122 on a lower level may trigger the release of the bio-waste stored in the secondary chute 710 as it passes beneath said secondary chute 710. In this manner, the stored bio-waste may be piled into the bio-waste cart 122 on a lower level and transported to the central chute 720 and bio-waste depository 730.

In one embodiment, the trigger for releasing potentially stored bio-waste in the secondary chute 710 may include a mechanical lever or similar device associated with the door or door-like mechanism such that a passing bio-waste cart physically interacts with the mechanical lever or similar device to open the door or door-like mechanism. This may release any stored bio-waste from the secondary chute 710 as the bio-waste cart 122 passes beneath the secondary chute 710. In another embodiment, the mechanical lever or similar device associated with the door may be acted upon by a defined portion of the transport system that will trigger the release of potentially stored bio-waste as the bio-waste cart 122 passes beneath the secondary chute 710.

In another embodiment, the trigger for releasing potentially stored bio-waste in the secondary chute 710 may include an electronic and/or electromagnetic release activated as the bio-waste cart 122 passes a pre-defined point. In one embodiment, the trigger may be activated by the interruption of an infrared light source and/or any other light source by the passing of bio-waste cart 122. In another embodiment, the trigger may be activated by the bio-waste cart 122 as it passes over a pressure-activated switch and/or button. The activated trigger causes the release of the door or door-like mechanism potentially holding stored bio-waste in the secondary chute 710.

Figure 7C:
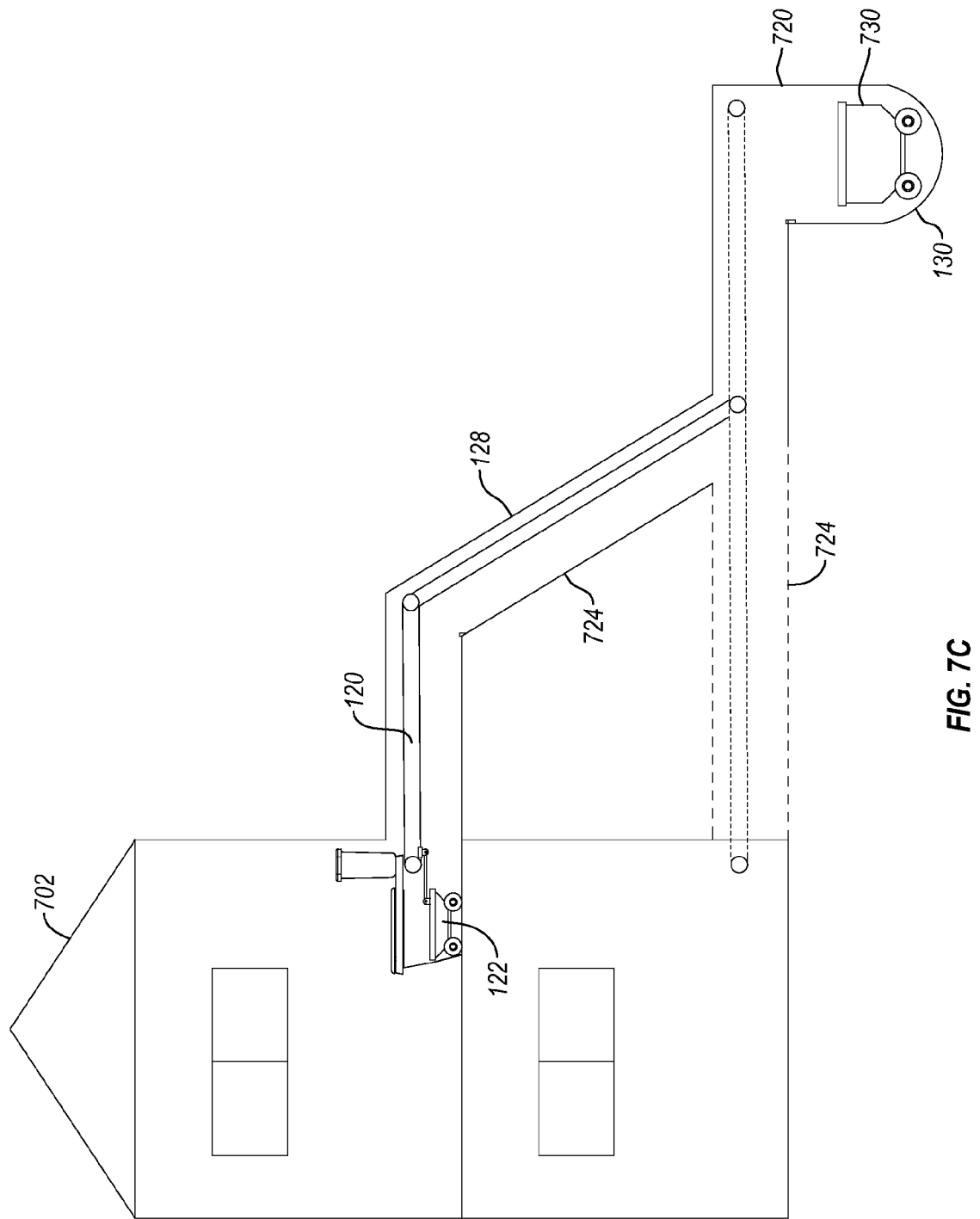
FIG. 7C illustrates possible configurations of a plurality of predefined pathways and tunnel-like structures according to implementations of the present disclosure.

FIG. 7C illustrates one embodiment of the present disclosure where the plurality of predefined pathways 724 converge prior to joining the central chute 720. In one embodiment, a predefined pathway 124 associated with an upper level of a multi-level structure 702 converges with a lower level predefined pathway 124 of multi-level structure 702. In one embodiment the transportation system 120 associated with the predefined pathway 124 of the upper level is continuous from the upper level to the lower level, ending at or near the central chute 720. In another embodiment, the transport system 120 of the upper level merges with the transport system 120 of the lower level, and the bio-waste cart 122 transports bio-waste to the bio-waste depository 730 using the transport systems of both the upper and lower levels.

In each of the embodiments described in FIGS. 7A, 7B, and 7C, multi-level structure 702 was illustrated as having two levels—an upper and a lower—with one predefined pathway associated with each level of multi-level structure 702. This is for illustrative purposes only and is not meant to be limiting. Multi-level structure 702 may have a plurality of levels with a plurality of pre-defined pathways 724 on each level and cumulatively among the levels. Further, the embodiments of FIG. 7 apply to any urban and/or rural multi-level structure that would require bio-waste removal, including residential structures, commercial structures, and/or business-related structures.

Figure 8A:
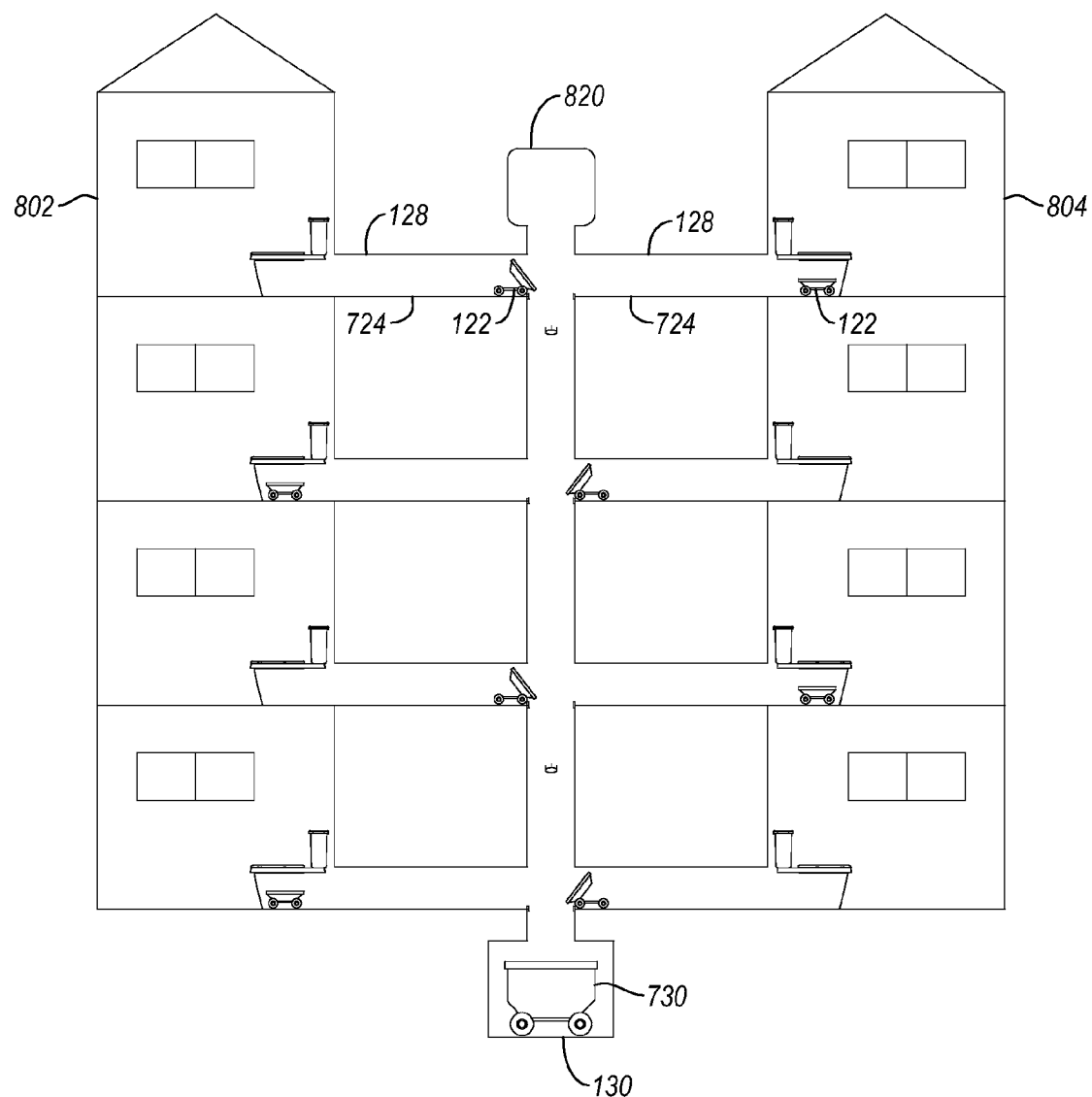
FIG. 8A illustrates a plurality of predefined pathways and tunnel-like structures converging on a central chute according to one implementation of the present disclosure.

Referring now to FIG. 8, illustrated are example embodiments of systems for transporting and collecting bio-waste from multiple, multi-level structures 802 and 804. In one embodiment depicted in FIG. 8A, each multi-level structure 802 and 804 is associated with a plurality of predefined pathways 724. The plurality of predefined pathways 724 converge into central chute 820 that services both multi-level structures 802 and 804 to collect bio-waste and transport said bio-waste into bio-waste depository 730 without using water as a carrier of the bio-waste.

In one embodiment illustrated in FIG. 8A, each level of multi-level structures 802 and 804 may be associated with at least one predefined pathway that is at least partially covered by tunnel-like structures 128. Each pathway may further be associated with a bio-waste cart 122 for transporting bio-waste to central chute 820. In one embodiment, the tunnel-like structures 128 and the central chute 820 have one or more access points. The access points allow for external access to the plurality of predefined pathways 724 concealed by the tunnel-like structures 128 and further provide access to the central chute 820 for maintenance, replacement, or viewing purposes. In one embodiment, the access points are hinged portions of the tunnel-like structures 128. In another embodiment, the access points are removable panels associated with the tunnel-like structures 128, and in yet another embodiment, the access points may be doors associated with the tunnel-like structures 128. In one embodiment, the central chute 820 may have any or all of the differing types of access points that may be associated with tunnel-like structures 128.

In one embodiment, one or more levels of multi-level structure 802 and/or 804 may not be associated with any of the plurality of predefined pathways 724. That is, in one embodiment of the present disclosure, there may be one or more levels of multi-level structures 802 and 804 that may not be directly associated with central chute 820. For example, the third level of a three level building may comprise an attic with no need for a manually operated bio-waste disposal system on that floor. As a further example, one floor of a multi-level structure may not have facilities that would require a bio-waste disposal system, and may, therefore, not have a predefined pathway associated with said floor that would lead to a central chute 820.

In one embodiment, any of the plurality of pre-defined pathways 724 associated with multi-level structures 802 and/or 804 may have configurations that are the same as or similar to those shown and described in connection with FIG. 7.

In one embodiment, multi-level structures 802 and 804 have the same number of levels. In one embodiment, multi-level structure 802 may have a different number of levels than multi-level structure 804. For example, multi-level structure 802 may have ten levels where multi-level structure 804 may have twenty levels. In another example, multi-level structure 802 may only have only one surface level and multi-level structure 804 may have two surface levels. In another embodiment, multi-level structures 802 and 804 may have the same number of levels but may differ in the number of predefined pathways associated with each structure, or multi-level structures 802 and 804 may differ in the number of predefined pathways converging on central chute 820.

In one embodiment, central chute 820 is associated with bio-waste depository 730, which is located in a subterranean element 130. In one embodiment, the subterranean element is in a sub-surface level of multi-level structure 802 and/or 804. In such an embodiment, the bio-waste depository 730 may be an incinerator or other container capable of recycling deposited bio-waste into thermal, mechanical, and/or electrical energy. Further, the incinerator or other container capable of recycling the bio-waste may be associated with a mechanism that can convert the bio-waste into thermal, mechanical, and/or electrical energy.

For example, in one embodiment, the bio-waste depository 730 may be an incinerator that transforms deposited bio-waste into thermal energy, and the thermal energy is used to power an electrical generator. In one embodiment, the power generated from recycling the transported bio-waste may be used to power portions of multi-level structures 802 and/or 804. Further embodiments may allow the electricity generated from recycling the bio-waste to power central chute 820 where central chute 820 is or includes a vacuum-like system for transporting the bio-waste from the plurality of predefined pathways 724 to the bio-waste depository 730. In another embodiment, the electricity generated from recycling the bio-waste may be used to power any associated device requiring electrical power. In one embodiment, the bio-waste depository 730 is not located in subterranean element 130 but may be set on the ground or suspended in the air.

Figure 8B:
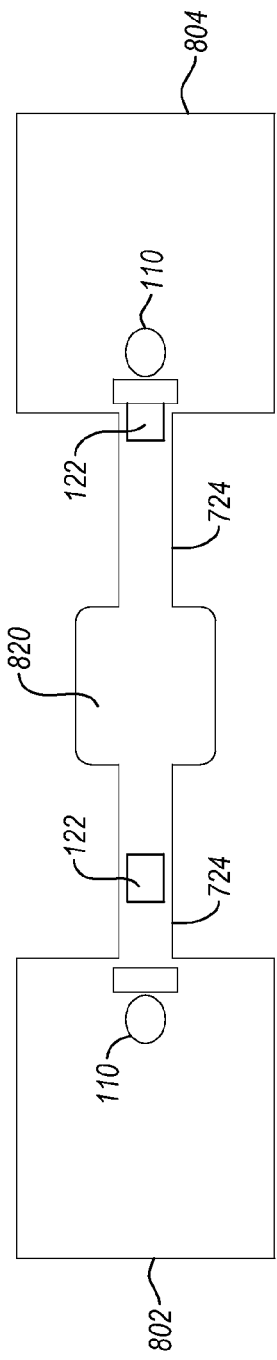
FIG. 8B illustrates an aerial view of a plurality of predefined pathways and tunnel-like structures converging on a central chute according to one implementation of the present disclosure.

Referring now to FIG. 8B, illustrated is an example embodiment of an aerial view of multi-level structures 802 and 804 associated with central chute 820 by a plurality of predefined pathways 724. Further, FIG. 8B illustrates bio-waste carts 122 traversing the plurality of predefined pathways 724 to and from central chute 820. In one embodiment, multi-level structures 802 and 804 include structures with a single surface level. For example, multi-level structures 802 and 804 may be suburban homes having a basement and a single surface level where central chute 820 is associated with a communal bio-waste depository 730. In another embodiment, multi-level structures 802 and 804 are actually single level structures. For example, multi-level structures 802 and 804 may be rural cabins with central chute 820 associated with a communal bio-waste depository 730.

Figure 8C:
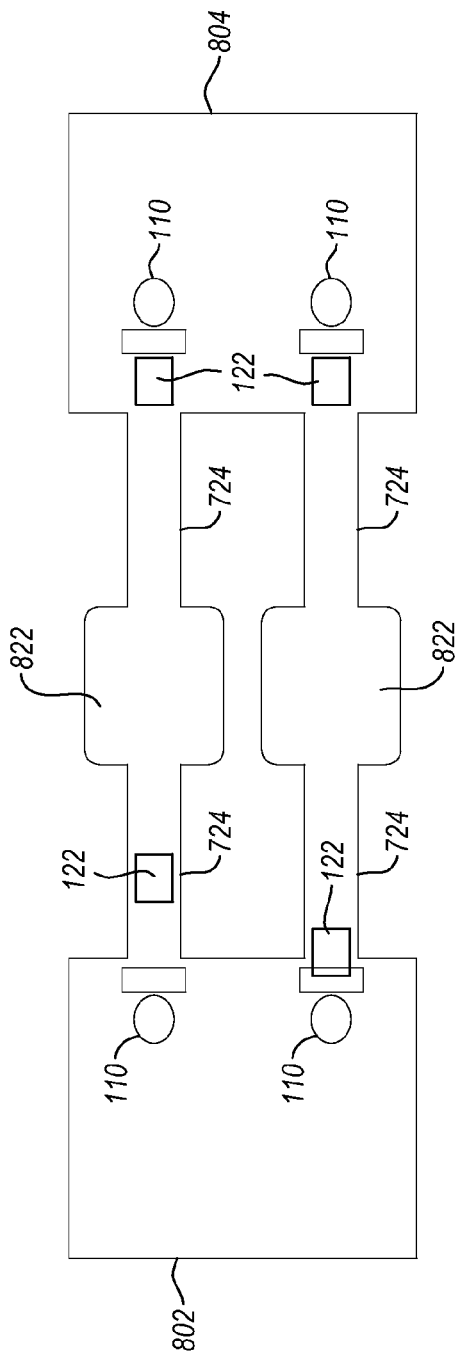
FIG. 8C illustrates an aerial view of a plurality of predefined pathways and tunnel-like structures converging on a central chute according to one implementation of the present disclosure.

Referring now to FIG. 8C, multi-level structures 802 and 804 may be associated with a plurality of central chutes 822 serving a plurality of predefined pathways 724. In one embodiment, the plurality of predefined pathways 724 are associated with individual bio-waste receptacles 110 on any given level and transport deposited bio-waste from the bio-waste receptacle 110 to one of a plurality of central chutes 822. In one embodiment, there is more than one bio-waste receptacle 110 on at least one level of the multi-level structure 802 and/or 804.

For example, multi-level structures 802 and/or 804 may be residential condominium or apartment complexes having multiple units on at least one floor of the multi-level structure. Each individual unit of the condominium or apartment complex may be associated with one or more bio-waste receptacles 110 and one or more of a plurality of predefined pathways 724. In one embodiment, a first subset of the plurality of predefined pathways 724 associated with the condominium or apartment complex may converge to a first central chute of a plurality of central chutes 822 while a second subset of the plurality of predefined pathways 724 associated with the condominium or apartment complex may converge to a second central chute of a plurality of central chutes 822. In another embodiment, each predefined pathway of the plurality of predefined pathways 724 is associated with one or more of a plurality of central chutes 822. In another embodiment, each of a plurality of central chutes 822 is associated with at least one predefined pathway 124.

Figure 9A:
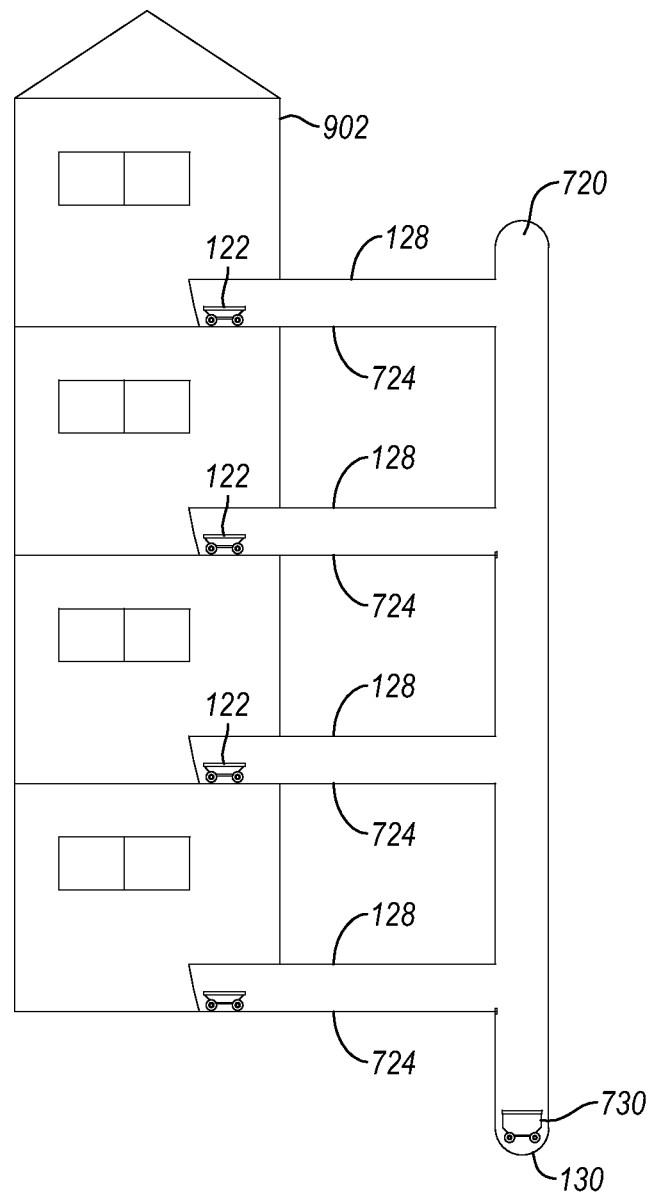
FIG. 9A illustrates a plurality of predefined pathways and tunnel-like structures converging on a central chute according to one implementation of the present disclosure.

Referring now to FIG. 9, illustrated are example embodiments of systems for transporting and collecting bio-waste from multi-level structure 902. In one embodiment of FIG. 9A, multi-level structure 902 is associated with a single central chute 720 having a plurality of predefined pathways 724 associated with the central chute 720 and the multi-level structure 902. In one embodiment, the central chute 720 is associated with a single bio-waste depository 730. In one embodiment, the bio-waste depository 720 is housed within a subterranean element 130. In another embodiment, the bio-waste depository is the subterranean element 130.

In another embodiment, bio-waste carts 122 associated with any given level of multi-level structure 902 can traverse the exterior of multi-level structure 902 to arrive at central chute 720. For example, a multi-level structure 902 may have a single central chute 720 associated with each level of multi-level structure 902. Each level of multi-level structure 902 may, in turn, have a plurality of bio-waste carts (or a single bio-waste cart 122) associated with it. A given bio-waste cart 122 associated with multi-level structure 902 may depart a bio-waste receptacle 110 associated with the interior portion of an exterior wall 115 of multi-level structure 902 and traverse a predefined pathway 124 associated with the exterior wall of multi-level structure 902, traveling—in some instances—around a portion and/or all of the circumference of multi-level structure 902 to arrive at central chute 720. The bio-waste cart 122 may then deposit the transported bio-waste into central chute 720 for collection by bio-waste depository 730.

As a more specific example of the previous embodiment, a bio-waste cart 122 may be associated with a bio-waste receptacle 110 on the eleventh floor of a thirty-two level building. Upon receiving a load of bio-waste from the bio-waste receptacle 110, the bio-waste cart 122, is transported along a predefined pathway that is associated with the circumference of the eleventh floor. This particular bio-waste cart 122 and its associated bio-waste receptacle 110 may be positioned on the opposite side of the building as the central chute 720 and would have to traverse the predefined pathway associated with the circumference of the eleventh floor until it arrived at the central chute 720. The bio-waste cart 122 may return to its associated bio-waste receptacle 110 on the opposite side of the building after depositing the bio-waste in the central chute 720.

Figure 9B:
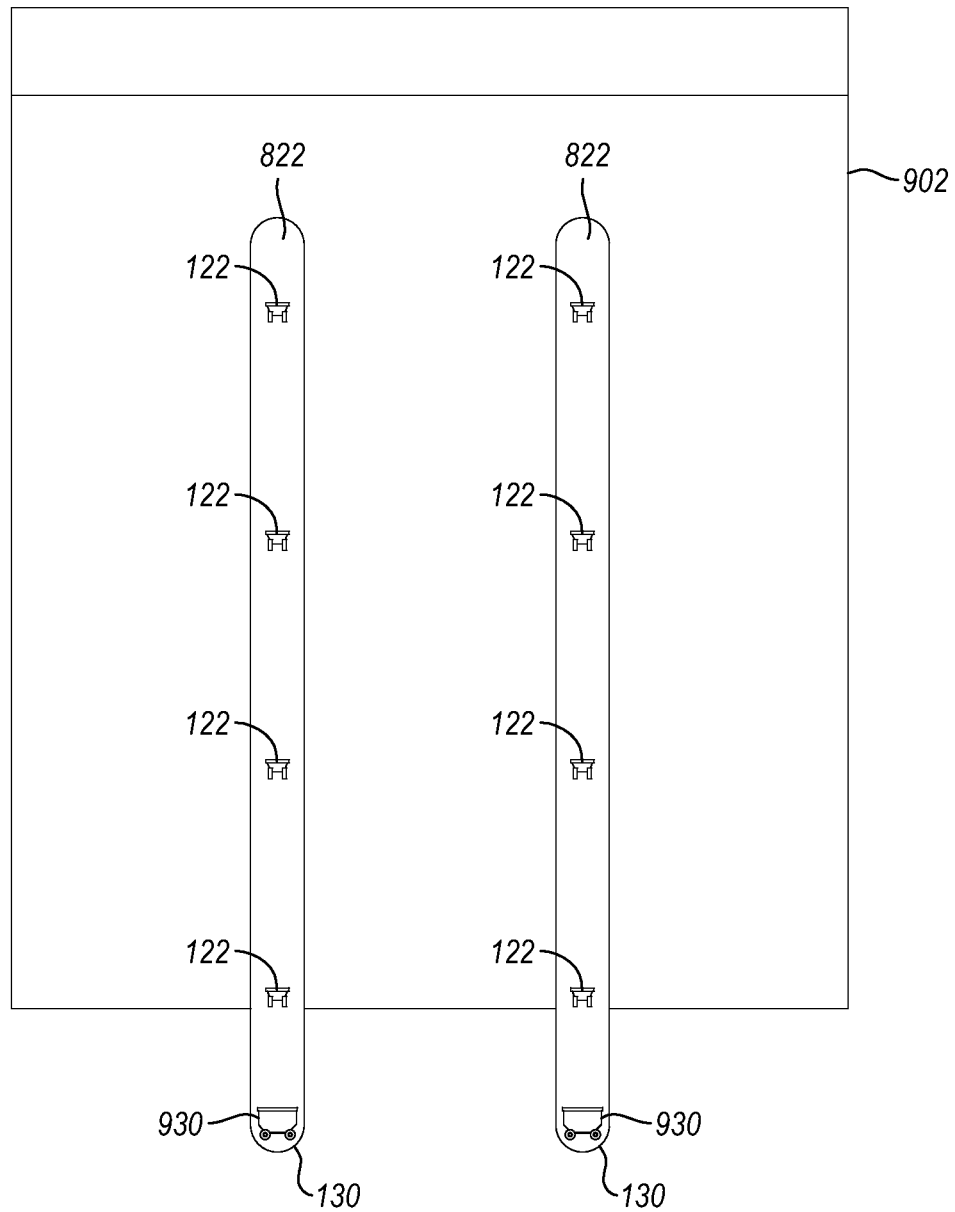
FIG. 9B illustrates a plurality of central chutes according to one implementation of the present disclosure.

Referring now to FIG. 9B, illustrated is an example embodiment of systems for transporting and collecting bio-waste from a multi-level structure 902. FIG. 9B a representative view of a single face of multi-level structure 902 having a plurality of central chutes 822 associated with multi-level structure 902. FIG. 9B is oriented such that the plurality of bio-waste depositories 930 are resting on or beneath the surface level of multi-level structure 902 and may be within subterranean elements 130. In one embodiment, multi-level structure 902 is associated with a plurality of central chutes 822 that are associated with one or more of a plurality of bio-waste depositories 930. In one embodiment, each central chute of the plurality of central chutes 822 is associated with one bio-waste depository 730 of the plurality of bio-waste depositories 930. In another embodiment, a subset of the plurality of central chutes 822 are associated with one bio-waste depository 730 of the plurality of bio-waste depositories 930. In another embodiment, the plurality of bio-waste depositories 903 are housed within one or more subterranean elements 130.

In one example embodiment, the plurality of central chutes associated with multi-level structure 902 are serviced by a single bio-waste depository 730. In one embodiment, the plurality of central chutes converge at a stationary bio-waste depository 730. In another embodiment, the single bio-waste depository 730 is mobile and is translocatable between the plurality of central chutes 822 to collect deposited bio-waste. For example, the plurality of central chutes 822 may be temporarily closed at one end proximate to the bio-waste depository 730 and collect deposited bio-waste until the bio-waste-depository is positioned in a location to accept the collected bio-waste from one or more of the plurality of central chutes 822. In one embodiment, the location for collecting bio-waste may be beneath one or more of the plurality of central chutes 822. For example, the bio-waste depository may collect bio-waste from the plurality of central chutes 822 sequentially. Bio-waste may be collected in each of the plurality of central chutes 822 and as the bio-waste depository is in a position to accept a transfer of collected bio-waste from one or more of the central chutes 822, the bio-waste may be released and collected by the single bio-waste depository 730. In another embodiment, the plurality of central chutes 822 are serviced by a plurality of bio-waste depositories 930 instead of a single bio-waste depository 730.

For example, there may be a plurality of central chutes 822 associated with the exterior of multi-level structure 902. Each of the plurality of central chutes 822 may collect bio-waste in anticipation of releasing the collected bio-waste into a single, mobile bio-waste depository 730 or multiple, mobile bio-waste depositories 930. The bio-waste depository 730/930 may be a dumpster or similar container positioned on the outside of multi-level structure 902 that may travel around multi-level structure 902 to central chutes 822 to collect the deposited and stored bio-waste. The bio-waste depository 730/930 may be positioned one or more predefined pathways 124/724 and powered by a transport system 120.

In another example, the plurality of central chutes 822 associated with multi-level structure 902 may collect bio-waste in anticipation of releasing the collected bio-waste into a mobile bio-waste depository 730/930. The bio-waste depository 730/930 may be a mobile cart or other container positioned in a subsurface level of multi-level structure 902 that may travel between the plurality of central chutes 822 to collect the stored bio-waste.

Referring now to FIG. 10, illustrated are example embodiments of systems for transporting and collecting bio-waste from multiple structures 1002. The systems and methods of transporting and collecting bio-waste contained herein may be utilized by communities of structures 1002 that share a communal bio-waste depository 730. In one embodiment, the bio-waste depository 730 may be housed within a subterranean element 130. In another embodiment, the bio-waste depository 730 is a subterranean element 130. For example, FIG. 10A illustrates one embodiment where a communal bio-waste depository 730 is associated with a row of structures 1002. The row of structures 1002 may access the bio-waste depository 730 through a plurality of predefined pathways 724, each structure 1002 having at least one predefined pathway 124. In one embodiment, structure 1002 may be a single level structure. In another embodiment, structure 1002 may be a multi-level structure. In yet another embodiment, the plurality of structures 1002 may comprise a mix of single level and multi-level structures.

Figure 10A:
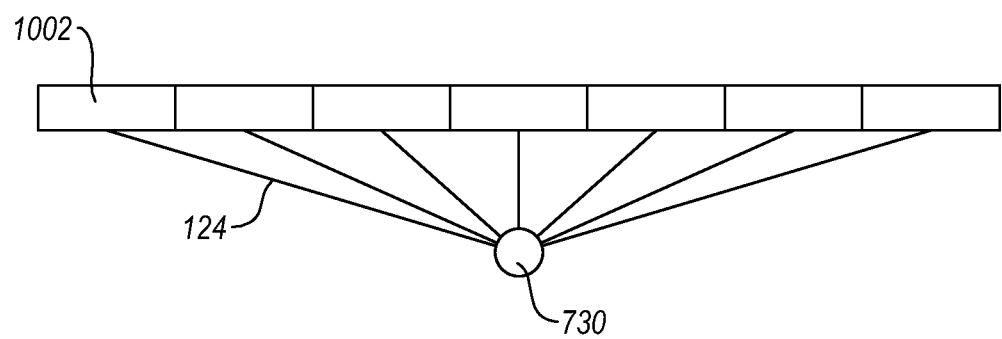
FIG. 10A illustrates various configurations of structures having predefined pathways that converge on a central bio-waste depository according to one implementation of the present disclosure.
Figure 10B:
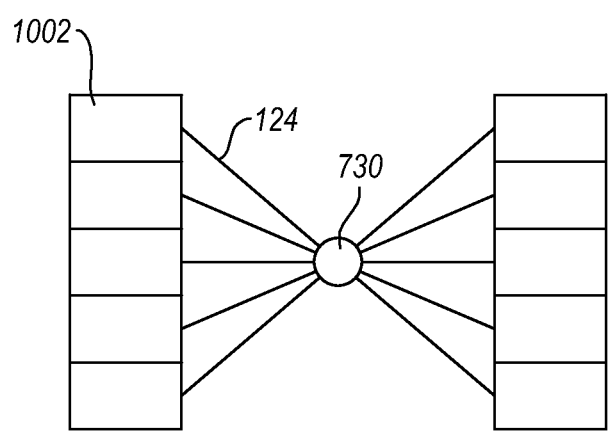
FIG. 10B illustrates various configurations of structures having predefined pathways that converge on a central bio-waste depository according to one implementation of the present disclosure.
Figure 10C:
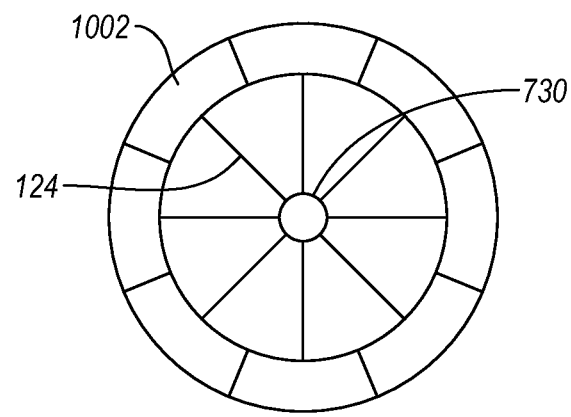
FIG. 10C illustrates various configurations of structures having predefined pathways that converge on a central bio-waste depository according to one implementation of the present disclosure.
Figure 10D:
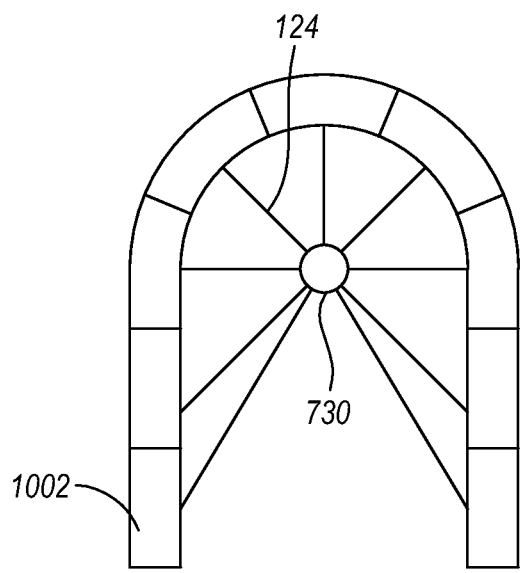
FIG. 10D illustrates various configurations of structures having predefined pathways that converge on a central bio-waste depository according to one implementation of the present disclosure.

The communal bio-waste depository 730 associated with structures 1002 may be positioned between structures 1002 in a variety of ways. For example, the communal bio-waste depository 730 may be associated with one or more rows of structures 1002. FIG. 10A illustrates one embodiment where a communal bio-waste depository 730 is associated with one row of structures 1002. In one embodiment, the row of structures 1002 may be offset from one another but nonetheless in a substantially linear configuration sharing a communal bio-waste depository 730. FIG. 10B illustrates one embodiment where a communal bio-waste depository 730 is associated with two rows of structures 1002. FIG. 10C illustrates another embodiment where a communal bio-waste depository 730 is positioned in the interior portion of a substantially circular configuration of structures 1002. In one embodiment, as shown in FIG. 10D, the communal bio-waste depository 730 is associated with structures 1002 in an arcuate manner. In one embodiment of the present disclosure, a communal bio-waste depository 730 is associated with more than one structure 1002, regardless of the geometric configuration of the structures 1002.

Figure 11A:
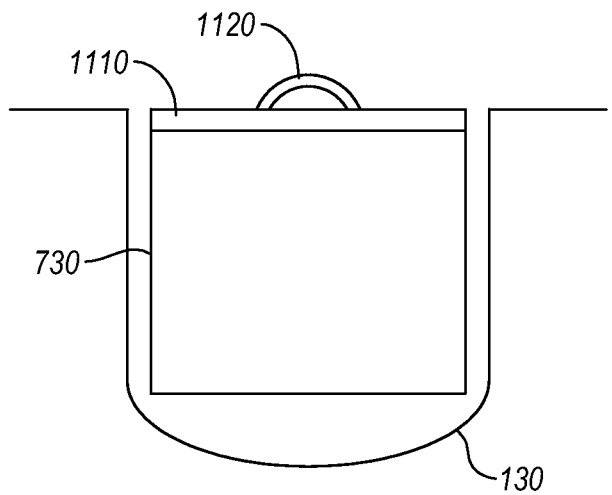
FIG. 11A illustrates a bio-waste depository with a removable liner according to one implementation of the present disclosure.
Figure 11B:
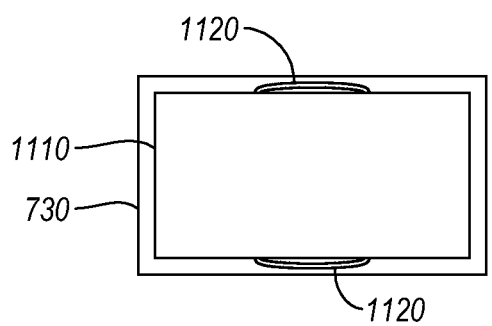
FIG. 11B illustrates a bio-waste depository with a removable liner according to one implementation of the present disclosure.

Referring now to FIGS. 11A and 11B, illustrated are example embodiments of a bio-waste depository 730 having a removable liner 1110. In one embodiment, the bio-waste depository 730 may be a container for collecting bio-waste, the container being fitted with a removable liner 1110. In one embodiment, the removable liner 1110 has at least one gripping member 1120 that is configured to assist in the removal of the removable liner 1110 from the bio-waste depository 730. For example, a removable liner 1110 may have two opposing gripping members 1120 that can be used to lift the liner out of the bio-waste depository 730.

In one embodiment, one or more people may grasp the gripping members 1120 to assist in the manual removal of the removable liner 1110 from the bio-waste depository 730. In another embodiment, a mechanical device may utilize the gripping members 1120 to remove the removable liner 1110 from the bio-waste depository 730. For example, a crane, forklift, or similar mechanized device may interact with the gripping members 1120 to remove the removable liner from the bio-waste depository 1120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for transporting and collecting bio-waste without using water as a carrier of the bio-waste, the system comprising:
 a plurality of bio-waste carts, the plurality of bio-waste carts being configured to receive and transport bio-waste along a plurality of predefined pathways, wherein at least a subset of the plurality of predefined pathways converge at a central chute;
 a bio-waste depository associated with the central chute, wherein the bio-waste depository is configured to collect transported bio-waste; and
 a transport system for moving the plurality of bio-waste carts along the plurality of predefined pathways, the transport system comprising a plurality of locomotive devices configured to advance and return the plurality of bio-waste carts to and from the central chute along the plurality of predefined pathways and through a plurality of tunnel structures, wherein the plurality of tunnel structures conceals at least a portion of the transport system;
 wherein the plurality of locomotive devices are manually operated locomotive devices configured to advance in response to work applied to the manually operated locomotive devices via a user manipulated operation mechanism, and
 wherein the plurality of manually operated locomotive devices are configured to return in response to additional work applied to the manually operated locomotive devices via the user manipulated operation mechanism.

2. The system as in claim 1, wherein the plurality of predefined pathways converge at a single central chute associated with the bio-waste depository.

3. The system as in claim 1, wherein a plurality of central chutes are associated with at least one of the plurality of predefined pathways.

4. The system as in claim 3, wherein a plurality of bio-waste depositories are associated with at least one of the plurality of central chutes.

5. The system as in claim 1, wherein the plurality of predefined pathways and the central chute can be accessed through a plurality of access points in the plurality of tunnel structures, the plurality of access points comprising at least one of the following: hinged portions, removable panels, and doors.

6. The system as in claim 1, wherein the bio-waste depository comprises a subterranean element having a container for collecting bio-waste.

7. The system in claim 6, wherein the container for collecting the bio-waste is selected from the group consisting of: a composter, a solar dehydrator, and a bio-digester.

8. The system as in claim 6, wherein the container for collecting bio-waste comprises a removable liner, the removable liner having at least one gripping member configured to assist in the removal of the removable liner from the container.

9. The system as in claim 1, wherein the bio-waste depository is an incinerator.

10. The system in claim 9, wherein the incinerator is coupled to an energy generator.

11. A system for transporting and collecting bio-waste, the system comprising:
   a plurality of predefined pathways, wherein the plurality of predefined pathways are configured to transport bio-waste without using water as a carrier of the bio-waste and wherein at least a portion of the plurality of predefined pathways converge at a central chute;
   a bio-waste depository associated with the central chute, wherein the bio-waste depository is configured to collect the bio-waste without the using water as the carrier of the bio-waste; and
   a transport system for transporting and collecting the bio-waste, the transport system comprising a plurality of locomotive devices configured to transport the bio-waste along the plurality of predefined pathways and through a plurality of tunnel structures, wherein the plurality of tunnel structures conceals at least a portion of the transport system;
   wherein the plurality of locomotive devices are manually operated locomotive devices configured to advance in response to work applied to the manually operated locomotive devices via a user manipulated operation mechanism, and
   wherein the plurality of manually operated locomotive devices are configured to return in response to additional work applied to the manually operated locomotive devices via the user manipulated operation mechanism.

12. The system as in claim 11, wherein the plurality of predefined pathways are associated with one or more levels of a multi-level structure.

13. The system as in claim 11, wherein the central chute associates one or more structures via the plurality of predefined pathways.

14. The system as in claim 13, wherein the one or more structures comprise at least one multi-level structure.

15. The system claim as in claim 11, wherein the bio-waste depository is translocatable along one or more of the plurality of predefined pathways.

16. A system for transporting and collecting bio-waste from two or more building structures without using water as a carrier of the bio-waste, the system comprising:
   two or more building structures;
   a plurality of bio-waste carts, the plurality of bio-waste carts being configured to receive and transport bio-waste from the two or more building structures along a plurality of predefined pathways;
   a bio-waste depository, wherein the bio-waste depository is configured to collect transported bio-waste;
   a transport system for moving the plurality of bio-waste carts along the plurality of predefined pathways, the transport system comprising a plurality of locomotive devices configured to advance and return the plurality of bio-waste carts to and from the bio-waste depository along the plurality of predefined pathways and through a plurality of tunnel structures, wherein the plurality of tunnel structures conceals at least a portion of the transport system; and
   wherein the plurality of locomotive devices are manually operated locomotive devices configured to advance in response to work applied to the manually operated locomotive devices via a user manipulated operation mechanism, and
   wherein the plurality of manually operated locomotive devices are configured to return in response to additional work applied to the manually operated locomotive devices via the user manipulated operation mechanism.

17. The system as in claim 16, wherein at least a subset of the plurality of predefined pathways converge at the depository.

18. The system as in claim 16, wherein at least one of the two or more building structures are multi-level building structures.

19. The system as in claim 18, further comprising one or more central chutes associated with the depository, wherein at least a subset of the plurality of predefined pathways converge at one or more of the central chutes.

20. The system as in claim 16, wherein the plurality of locomotive devices are manually operated locomotive devices configured to advance and return via a user manipulated operation mechanism.

* * * * *